(12) United States Patent  
Li et al.

(10) Patent No.: US 12,046,753 B2  
(45) Date of Patent: Jul. 23, 2024

(54) NEGATIVE ELECTRODE PLATE, SECONDARY BATTERY, BATTERY PACK, BATTERY MODULE, AND ELECTRICAL DEVICE

(71) Applicant: CONTEMPORARY AMPEREX TECHNOLOGY CO., LIMITED, Ningde (CN)

(72) Inventors: Yuanyuan Li, Ningde (CN); Rui Shen, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/959,188

(22) Filed: Oct. 3, 2022

(65) Prior Publication Data
US 2023/0098119 A1  Mar. 30, 2023

Related U.S. Application Data

(63) Continuation of application No. PCT/CN2021/117185, filed on Sep. 8, 2021.

(51) Int. Cl.
*H01M 4/583* (2010.01)
*H01M 4/02* (2006.01)
(Continued)

(52) U.S. Cl.
CPC ......... *H01M 4/583* (2013.01); *H01M 4/0435* (2013.01); *H01M 10/0525* (2013.01);
(Continued)

(58) Field of Classification Search
CPC ............. H01M 4/583; H01M 4/0435; H01M 10/0525; H01M 2004/021; H01M 2004/027; H01M 2220/20
See application file for complete search history.

(56) References Cited

U.S. PATENT DOCUMENTS

2014/0363736 A1* 12/2014 Kim ................. H01M 4/133  
    429/223  
2020/0152964 A1* 5/2020 Li ..................... H01M 10/0525  
(Continued)

FOREIGN PATENT DOCUMENTS

CN     111628141 A     9/2020  
CN     113036298     * 6/2021  
(Continued)

OTHER PUBLICATIONS

Contemporary Amperex Technology Co., Limited, International Search Report and Written Opinion, PCT/CN2021/117185, May 26, 2022, 14 pgs.

(Continued)

*Primary Examiner* — Ula C Ruddock  
*Assistant Examiner* — Armindo Carvalho, Jr.  
(74) *Attorney, Agent, or Firm* — XSENSUS LLP

(57) ABSTRACT

This application provides a negative electrode plate, including an active layer 1 and an active layer 2. The active layer 1 contains an active material 1, and the active layer 2 contains an active material 2. A powder OI value of the active material 1 falls in a range of 8 to 32, and a powder OI value of the active material 2 falls in a range of 2 to 7. A gram capacity of the active material 1 falls in a range of 290 to 350 mAh/g, and a gram capacity of the active material 2 falls in a range of 350 to 368 mAh/g. A ratio α of the powder OI value between the active material 1 and the active material 2 falls in a range of 2.00 to 6.25.

20 Claims, 5 Drawing Sheets

(51) Int. Cl.
    *H01M 4/04* (2006.01)
    *H01M 10/0525* (2010.01)
(52) U.S. Cl.
    CPC .......... *H01M 2004/021* (2013.01); *H01M 2004/027* (2013.01); *H01M 2220/20* (2013.01)

(56) References Cited

U.S. PATENT DOCUMENTS

| | | | |
|---|---|---|---|
| 2021/0336244 | A1 | 10/2021 | Kang et al. |
| 2022/0123307 | A1* | 4/2022 | Li .................. C01B 32/205 |

FOREIGN PATENT DOCUMENTS

| | | | |
|---|---|---|---|
| CN | 113036298 A | * | 6/2021 |
| CN | 113207313 A | | 8/2021 |
| JP | 2015-524992 A | | 8/2015 |
| KR | 102005779 B1 | | 8/2019 |
| WO | WO2019131861 A1 | | 7/2019 |
| WO | WO2021/108981 A1 | | 6/2021 |
| WO | WO2021/109133 A1 | | 6/2021 |
| WO | WO2021108981 A | * | 6/2021 |

OTHER PUBLICATIONS

Contemporary Amperex Technology Co., Limited, Office Action, KR10-2022-7037515, Mar. 30, 2023, 6 pgs.

Office Action issued Mar. 30, 2023 in Korean Patent Application No. 10-2022-7037515, 7 pages. (Previously filed; submitting English translation only.).

Office Action issued Jul. 27, 2023 in Korean Patent Application No. 10-2022-7037515, 7 pages.

Office Action issued Nov. 7, 2023 in Japanese Patent Application No. 2022-562403 with English translation thereof, 10 pages.

Office Action issued Nov. 27, 2023 in Korean Patent Appellation No. 10-2022-7037515 with English translation thereof, 10 pages.

* cited by examiner

NEGATIVE ELECTRODE PLATE, SECONDARY BATTERY, BATTERY PACK, BATTERY MODULE, AND ELECTRICAL DEVICE

CROSS-REFERENCE TO RELATED APPLICATION

This application is a continuation application of PCT Patent Application No. PCT/CN2021/117185, entitled "NEGATIVE ELECTRODE PLATE, SECONDARY BATTERY, BATTERY PACK, BATTERY MODULE, AND ELECTRICAL DEVICE" filed on Sep. 8, 2021, which is incorporated herein by reference in its entirety.

TECHNICAL FIELD

This application relates to the technical field of lithium batteries, and in particular, to a negative electrode plate characterized by reduced expansion during cycling. In addition, this application further relates to a method for preparing the negative electrode plate, a secondary battery containing the negative electrode plate, a battery pack containing the secondary battery, a battery module, and an electrical device.

BACKGROUND

In recent years, the application scope of lithium-ion batteries has been expanded. The lithium-ion batteries are widely used in energy storage power systems such as hydro, thermal, wind, and solar power stations, and many other fields such as electric tools, electric bicycles, electric motorcycles, and electric vehicles, military equipment, and aerospace. The great development of the lithium-ion batteries gives rise to higher requirements on the durability of the batteries.

Along with the increased number of cycles of a lithium-ion battery, a negative electrode plate in the lithium-ion battery is expanding, and the expansion force of the battery keeps increasing, thereby deteriorating the cycle performance and durability of the battery. Therefore, reducing the expansion of the negative electrode plate is considered to be the best choice for improving the durability of the battery. Currently, applying a coating layer and adding different binders are relatively effective approaches to improving the anti-expansion performance of the negative electrode. However, existing approaches impair the performance of the lithium-ion battery to different extents such as impair the energy density of the lithium-ion battery, and can hardly achieve the effect of continuously reducing expansion. Therefore, existing negative electrode plates still need to be improved.

SUMMARY

This application is put forward in view of the foregoing problems. An objective of this application is to provide a negative electrode plate capable of continuously maintaining a low expansion rate during cycling, so as to improve durability of a battery.

To achieve the objective, this application provides a negative electrode plate.

A first aspect of this application provides a negative electrode plate, including:

a current collector;
a first active layer, located on at least one surface of the current collector, and containing an active material 1; and
a second active layer, located on at least one surface that is of each of the two first active layers and that is away from the current collector, and containing an active material 2.

A powder OI (orientation index) value of the active material 1 falls in a range of 8 to 32, and optionally in a range of 10 to 25, and a powder OI value of the active material 2 falls in a range of 2 to 7, and optionally in a range of 3 to 6.

A gram capacity of the active material 1 falls in a range of 290 to 350 mAh/g.

A gram capacity of the active material 2 falls in a range of 350 to 368 mAh/g.

By limiting the OI value and gram capacity of the active material to the foregoing ranges, the negative electrode plate according to this application effectively reduces volume expansion during cycling on the basis of ensuring a high force of bonding with the current collector and a large capacity required by the secondary battery, thereby improving the cycle performance and energy density of the secondary battery.

In any embodiment, a ratio $\alpha$ of the powder OI value between the active material 1 and the active material 2 falls in a range of 2.00 to 6.25.

Therefore, by limiting the ratio of the powder OI value between the active material 1 and the active material 2 to a given range, this application effectively reduces the expansion of the negative electrode plate during cycling.

In any embodiment, in the negative electrode plate, a ratio $\beta$ of the gram capacity between the active material 1 and the active material 2 falls in a range of 0.80 to 1.00.

By further limiting the range of the ratio $\beta$ of the gram capacity of the active material in the first active layer to the gram capacity of the active material in the second active layer, this application further achieves the effect of reducing the expansion of the negative electrode plate on the basis of ensuring relatively high performance of the battery.

In any embodiment, a ratio of $\alpha$ to $\beta$, that is, $\alpha/\beta$, falls within a range of 2.0 to 6.7.

By limiting a difference in the gram capacity and a difference in the OI value between the first active layer and the second active layer of the negative electrode plate to a given range, this application can ensure a high bonding force unexpectedly while achieving the effects of a low expansion rate and a high energy density concurrently. The electrode plate applied in a secondary battery can improve durability of the secondary battery.

In this application, the artificial graphite is an active material in an active layer configured to prepare a negative electrode plate. In any embodiment, a volume median diameter $D_{v50}$ of the artificial graphite for use in the active material 1 may be 8 to 24 μm, optionally 10 to 20 μm; and the graphitization degree thereof may be 85.0% to 90.0%, and optionally 86.0% to 89.9%. The volume median diameter $D_{v50}$ of the artificial graphite for use in the active material 2 may be 6 to 24 μm, optionally 8 to 20 μm; and the graphitization degree thereof may be 90.0% to 97.5%, and optionally 90.2% to 96.8%.

In any embodiment, a powder resistivity of the artificial graphite for use in the active material 1 under an 8 MPa pressure may be at most 0.035 Ω·cm, and optionally at most 0.025 Ω·cm. A powder resistivity of the artificial graphite for use in the active material 2 under an 8 MPa pressure may be at most 0.035 Ω·cm, and optionally at most 0.025 Ω·cm.

In any embodiment, an areal density of the first active layer is 3 to 10 mg/cm², and optionally 4 to 8 mg/cm². An areal density of the second active layer is 3 to 10 mg/cm², and optionally 4 to 8 mg/cm².

In any embodiment, in the negative electrode plate, based on a total weight of the first active layer, a weight percent of the active material 1 falls in a range of 92.0 wt % to 98.99 wt %. In some embodiments, in the negative electrode plate, based on a total weight of the second active layer, a weight percent of the active material 2 falls in a range of 92.0 wt % to 98.99 wt %.

In any embodiment, a porosity of the negative electrode plate is 18.0% to 40.2%, and optionally 22.5% to 35.0%.

In any embodiment, a compacted density of the negative electrode plate is 1.45 to 1.90 g/cm³, and optionally 1.55 to 1.80 g/cm³.

In any embodiment, after being cold-calendered, a thickness of the first active layer is 20 to 135 µm, and optionally 30 to 120 µm; and, after being cold-calendered, a thickness of the second active layer is 20 to 135 µm, and optionally 30 to 120 µm.

In any embodiment, the first active layer and the second active layer each further include a conductive agent, a binder, and a thickener that are conventionally for use in a negative electrode plate in this field.

In any embodiment, the active material 1 in the first active layer further includes a small amount (weight percent is less than or equal to 10 wt %, based on the total weight of all active materials) of other carbon materials such as hard carbon and soft carbon in addition to artificial graphite.

In any embodiment, the active material 2 in the second active layer further includes a small amount (weight percent is less than or equal to 10 wt %, based on the total weight of all active materials) of other carbon materials such as hard carbon and soft carbon in addition to artificial graphite.

A second aspect of this application provides a secondary battery. The secondary battery includes the negative electrode plate according to the first aspect of this application.

A third aspect of this application provides a battery module. The battery module includes the secondary battery according to the second aspect of this application.

A fourth aspect of this application provides a battery pack. The battery pack includes the battery module according to the third aspect of this application.

A fifth aspect of this application provides an electrical device. The electrical device includes at least one of the secondary battery according to the second aspect, the battery module according to the third aspect, or the battery pack according to the fourth aspect of this application.

This application achieves at least the following beneficial effects:

In the negative electrode plate designed by the inventor hereof, the active materials of the first active layer and the second active layer are selected reasonably, and the gram capacity and the OI value are controlled comprehensively to fall in a reasonable range to equalize the expansion of the entire negative electrode plate and significantly reduce the overall expansion of the negative electrode plate. This application develops a negative electrode plate with a high gram capacity and a low expansion rate by comprehensively controlling the powder OI value and gram capacity of the active material 1 and leveraging a synergistic effect between the powder OI value and the gram capacity. The secondary battery prepared in this way achieves a high energy density and high cycle performance concurrently.

The battery module, the battery pack, and the electrical device according to this application each contain the lithium-ion battery according to this application, and therefore, have at least the same advantages as the lithium-ion battery.

Figure 1:
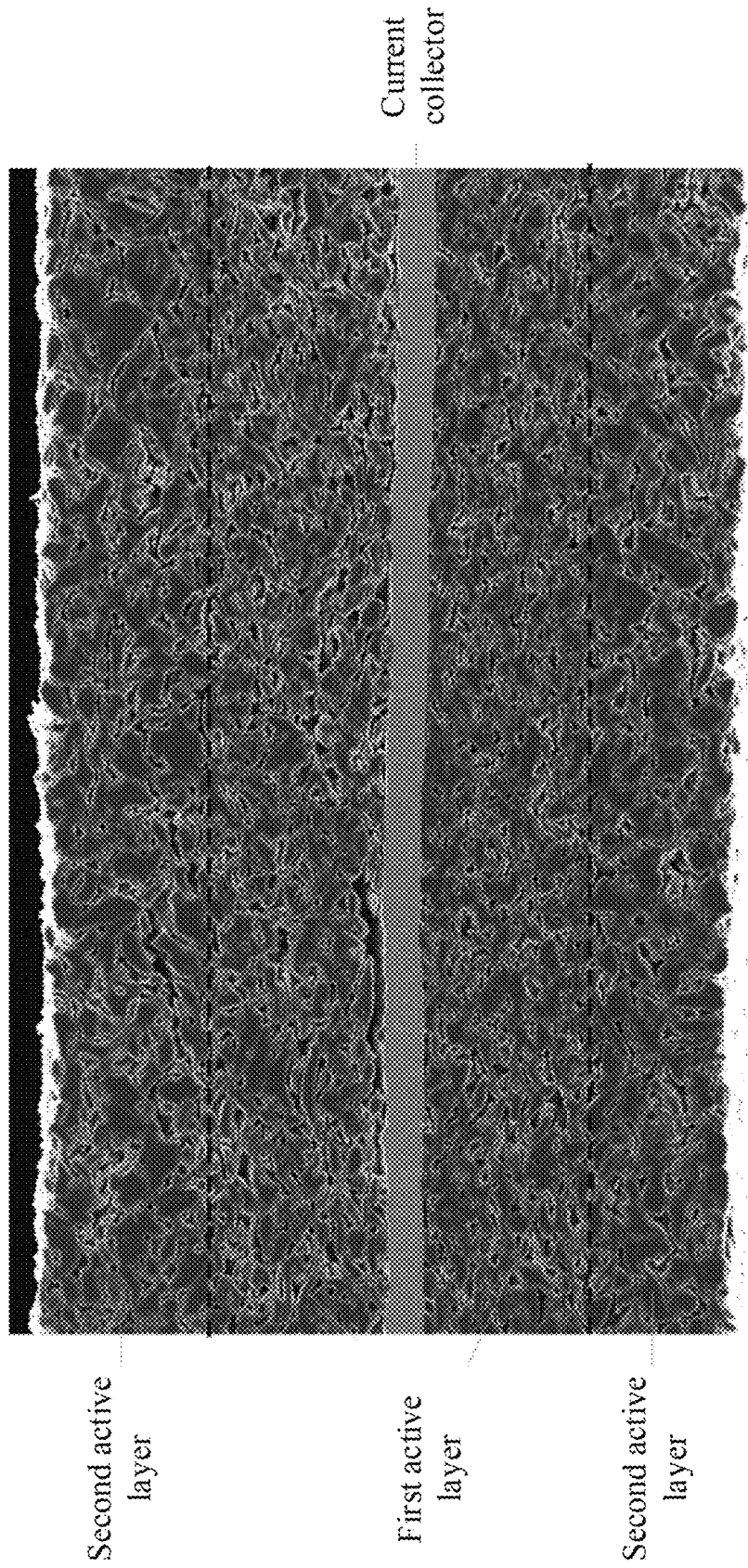
FIG. 1 is a sectional view of a negative electrode plate sectioned along a thickness direction according to an embodiment of this application.

REFERENCE NUMERALS 1. battery pack; 2. upper box; 3. lower box; 4. battery module; 5. secondary battery; 51. housing; 52. electrode assembly; 53. cap assembly.

DETAILED DESCRIPTION OF EMBODIMENTS

The following describes in detail a negative electrode plate and a preparation method thereof, a positive electrode plate, a secondary battery, a battery module, a battery pack, and an electrical device according to this application with due reference to drawings. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 6. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and the like.

Unless otherwise expressly specified herein, all embodiments and optional embodiments hereof may be combined with each other to form a new technical solution.

Unless otherwise expressly specified herein, all technical features and optional technical features hereof may be combined with each other to form a new technical solution.

Unless otherwise expressly specified herein, all the steps described herein may be performed sequentially or randomly, and preferably, performed sequentially. For example, that the method includes steps (a) and (b) indicates that the method may include steps (a) and (b) performed sequentially, or steps (b) and (a) performed sequentially. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, and may also mean closed-ended inclusion. For example, the terms "include" and "comprise" may mean inclusion of other items not listed, or inclusion of only the listed items.

Unless otherwise expressly specified herein, the term "or" is inclusive. For example, the phrase "A or B" means "A alone, B alone, or both A and B." More specifically, the condition "A or B" is satisfied by any of the following: A is true (or existent) and B is false (or absent); A is false (or absent) and B is true (or existent); or, both A and B are true (or existent).

The inventor hereof finds that, during cycling of a secondary battery, repeated delithiation processes of a negative electrode plate causes a lattice of a negative active material to change irreversibly, and therefore, causes a negative active layer to expand in volume. Severe expansion of an electrode plate increases the risk of the negative active material layer peeling off a surface of a current collector on the one hand, and, on the other hand, causes numerous cracks to be generated in all directions inside the electrode plate, thereby significantly deteriorating cycle performance of the battery. In addition, due to numerous cracks inside the expanded electrode plate, an electrolytic solution is excessively concentrated at the cracks rather than uniformly dispersed in all pore structures of the negative active material layer, thereby resulting in poor infiltration by the electrolytic solution, and in turn, deteriorating the cycle performance of the battery.

Especially, a gram capacity of the negative active material is increased continuously in order to increase an overall energy density of the battery. This makes the foregoing problems severer, and deteriorates the battery performance more noticeably.

Based on the technical problems found above, by approaching the problems from modification of the electrode plate, the inventor hereof has developed a negative electrode plate characterized by a high gram capacity and a low expansion rate. A secondary battery thereby prepared achieves a high energy density and high cycle performance concurrently.

[Negative Electrode Plate]

Referring to FIG. 1, this application discloses a negative electrode plate, including:

a current collector;

a first active layer, located on at least one surface of the current collector, and containing an active material 1; and a second active layer, located on at least one surface that is of each of the two first active layers and that is away from the current collector, and containing an active material 2.

A powder OI value of the active material 1 falls in a range of 8 to 32, and optionally in a range of 10 to 25.

A powder OI value of the active material 2 falls in a range of 2 to 7, and optionally in a range of 3 to 6.

A gram capacity of the active material 1 falls in a range of 290 to 350 mAh/g.

A gram capacity of the active material 2 falls in a range of 350 to 368 mAh/g.

The negative electrode plate according to this application includes a first active layer and a second active layer, the powder OI value of the active material 1 in the first active layer is greater than the powder OI value of the active material 2 in the second active layer, and the gram capacity of the active material 2 is not lower than the gram capacity of the active material 1. Reasons for such a design are as follows:

The powder OI value of the negative active material in the second active layer is relatively low, so that the degree of isotropy is high. Even if a microstructure of the negative active material incurs irreversible lattice expansion, the expansion stress can be dispersed in all directions, thereby preventing cracks from occurring in all directions inside the negative active layer. However, unexpectedly, the negative active material with a lower OI value is less capable of being bonding with the current collector. Therefore, the second active layer is prone to be detached from the current collector. Therefore, a first active layer is disposed between the second active layer and the surface of the current collector. The powder OI value of the active material 1 in the first active layer is relatively high, thereby significantly improving the bonding force between the entire active layer and the surface of the current collector.

However, the expansion rate of the first active layer is increased when the powder OI value of the active material 1 is designed to be relatively high in order to improve the bonding force between the entire active layer and the surface of the current collector. Therefore, in order to reduce the expansion caused by the high OI value of the negative active material, the gram capacity of the active material 1 in the first active layer is designed to be relatively low in this application, thereby alleviating the irreversible expansion of the active layer caused by the repeated deintercalation of lithium ions.

In addition, with a view to improving the energy density of the entire negative electrode plate, this application designs a relatively high gram capacity of the active material 2 in the second active layer, thereby improving the energy density of the entire negative electrode plate.

To sum up, in the negative electrode plate designed by the inventor hereof, the active materials of the first active layer and the second active layer are selected reasonably, and the gram capacity and the OI value are controlled comprehensively to fall in a reasonable range to equalize the expansion of the entire negative electrode plate and significantly reduce the overall expansion of the negative electrode plate. This application develops a negative electrode plate with a high gram capacity and a low expansion rate by comprehensively controlling the powder OI value and gram capacity of the active material 1 and leveraging a synergistic effect between the powder OI value and the gram capacity. The secondary battery prepared in this way achieves a high energy density and high cycle performance concurrently.

In this application, the powder OI value of the active material is defined as a ratio of a peak area C004 of the (004)

crystal plane diffraction peak to a peak area C110 of the (110) crystal plane diffraction peak in an X-ray diffraction pattern of active material powder, that is, OI value=C004/C110.

In this application, the OI value of the active material is tested according to the standard JISK0131-1996 by using an X-ray diffractometer. The X-ray diffraction pattern of the active material, which is obtained in the test, is analyzed and computed by XRD pattern analysis software such as Highscore Plus or Jade, so as to obtain the peak area C004 of the (004) crystal plane diffraction peak and the peak area C110 of the (110) crystal plane diffraction peak. OI value=C004/C110.

In this application, the gram capacity of the active material is defined as a ratio of a capacitance (mAh) releasable by the active material to the mass (g) of the active material.

In this application, the gram capacity of the active material may be determined by the following method: Mixing well the active material, a conductive agent, and a binder at a preset mass ratio in a solvent to make a slurry; and coating a current collector copper foil with the prepared slurry, and drying the current collector in an oven so as to be ready for future use; using a metal lithium sheet as a counter electrode. Using a polyethylene (PE) film as a separator; mixing ethylene carbonate (EC), ethyl methyl carbonate (EMC), and diethyl carbonate (DEC) at a volume ratio of 1:1:1, and dissolving $LiPF_6$ in the forgoing solution homogeneously to obtain an electrolytic solution, in which the concentration of $LiPF_6$ is 1 mol/L; and assembling the foregoing parts into a CR2430 button battery in an argon gas-protected glovebox.

Leaving the obtained button battery to stand for 12 hours, and then discharging the battery at a constant current of 0.05 C until the voltage reaches 0.005 V, and leaving the battery to stand for 10 minutes; discharging the battery at a constant current of 50 μA until the voltage reaches 0.005 V, and leaving the battery to stand for 10 minutes; discharging the battery at a constant current of 10 μA until the voltage reaches 0.005 V; subsequently, and charging the battery at a constant current of 0.1 C until the voltage reaches 2 V, and recording the charge capacity. The ratio of the charge capacity to the mass of the artificial graphite is the gram capacity of the prepared artificial graphite.

In some embodiments, the powder OI value of the active material 1 may be 8, 9, 10, 11, 12, 16, 25, 32, or fall within a range formed by any two thereof. In some embodiments, the powder OI value of the active material 2 may be 2, 3, 4, 6, 7, or fall within a range formed by any two thereof. In some embodiments, the gram capacity of the active material 1 may be 290, 310, 320, 340, 350, or fall within a range formed by any two thereof. In some embodiments, the gram capacity of the active material 2 may be 350, 355, 360, 365, 368, or fall within a range formed by any two thereof.

In some embodiments, a ratio $\alpha$ of the powder OI value between the active material 1 and the active material 2 falls in a range of 2.00 to 6.25.

In terms of the OI value, this application uses the ratio $\alpha$ of the OI value of the active material in the first active layer to the OI value of the active material in the second active layer to represent the difference in the expansion reduction capability between the two active layers. The inventor finds that the expansion of the negative electrode plate can be reduced without performance decline of the battery only if the difference in the active material OI value between the two active layers falls within a given range.

In some embodiments, the a value may be 2.00, 2.29, 2.50, 2.75, 3.00, 4.00, 4.50, 5.33, 6.25, or fall within a range formed by any two thereof.

In some embodiments, in the negative electrode plate, a ratio $\beta$ of the gram capacity between the active material 1 and the active material 2 falls in a range of 0.80 to 1.00.

In terms of the gram capacity, this application uses the ratio R of the gram capacity of the active material in the first active layer to the gram capacity of the active material in the second active layer to represent the difference in the expansion reduction capability between the two active layers. The inventor finds that the expansion of the negative electrode plate can be reduced without performance decline of the battery only if the difference in the active material gram capacity between the two active layers falls within a given range.

In some embodiments, a ratio of $\alpha$ to $\beta$, that is, $\alpha/\beta$, falls within a range of 2.0 to 6.7.

The OI value represents orderliness of the material in a given direction. The orderliness determines the capabilities of distributing and transferring the electrical properties of the material in the entire material. During dynamic operation of an electrode, the gram capacity and the OI value need to be matched properly between the two layers to ensure a smooth transition of electrical properties between the two layers and prevent a "fall", thereby ensuring stable operation of the electrode plate. By observing the relationship between the gram capacity and the OI value, the inventor of this application also unexpectedly finds that the difference represented in terms of the OI value deviates from the difference represented in terms of the gram capacity, and the deviation needs to be neither too small nor too large. Too small and too large deviations lead to severe expansion of the negative electrode plate. Therefore, a ratio of $\alpha$ to $\beta$, that is, $\alpha/\beta$, falls within a range of 2.0 to 6.7.

In some embodiments, the first active layer is located on both surfaces of the current collector to form two first active layers, and the second active layer is located on both surfaces that are of each of the two first active layers and that are away from the current collector.

In the negative electrode plate according to this application, an areal density of the first active layer is 3 to 10 $mg/cm^2$, and optionally 4 to 8 $mg/cm^2$. An areal density of the second active layer is 3 to 10 $mg/cm^2$, and optionally 4 to 8 $mg/cm^2$.

The areal density of the active layer represents the amount of coating on the electrode plate. Deficient areal density impairs the energy density of the battery, but excessive areal density leads to inferior kinetic performance of the battery. Therefore, the areal density of the active layer needs to be controlled within a given range. In this application, the areal density is measured by a conventional method in this field, or may be measured by the following method: cutting out 15 discs from the negative electrode plate and the current collector separately by punching (the current collector is produced in the same batch as the negative electrode plate), each disc being S (unit: $cm^2$) in area; weighing the discs, and averaging out to obtain an average mass of the negative electrode plate and an average mass of the current collector. The average mass of the negative electrode plate is M1 (unit: mg), and the average mass of the current collector is M2 (unit: mg). When the active material layer is disposed on a single side of the current collector, the areal density is: (M1−M2)/S. When the active material layer is disposed on both sides of the current collector, the areal density is: (M1−M2)/2S.

In some embodiments, in the negative electrode plate, based on a total weight of the first active layer, a weight percent of the active material 1 falls in a range of 92.0 wt % to 98.99 wt %. In some embodiments, in the negative electrode plate, based on a total weight of the second active layer, a weight percent of the active material 2 falls in a range of 92.0 wt % to 98.99 wt %. When the weight percent of the active material in the active layer of the negative electrode plate is relatively low, for example, lower than the foregoing range, the coating amount on the negative electrode plate is relatively large, but the energy density of the secondary battery is low. When the weight percent of the active material in the active layer is relatively high, for example, higher than the foregoing range, the processability of a slurry is relatively low, where the slurry is formed of the active material and other ingredients configured to make the active layer.

In some embodiments, in the negative electrode plate, a porosity of the negative electrode plate is 18.0% to 40.2%, and optionally 22.5% to 35.0%. When the porosity of the negative electrode plate is relatively low, the electrolytic solution can hardly infiltrate, liquid phase transfer of lithium ions is limited, and the kinetic properties of the electrode plate are inferior. When the porosity of the negative electrode plate is higher, pores need to be filled with a larger amount of electrolytic solution, thereby resulting in a low energy density of the secondary battery.

The porosity of the negative electrode plate in this application means the porosity of the entire active layer on the surface of the negative current collector, and may be determined according to the following steps: (i) calculating V1: cutting out 30 discs as specimens from the negative electrode plate by punching, each being 13 mm in diameter, placing the specimens into a true-density densitometer to measure a true volume of each specimen, averaging out the true volumes of the 30 discs, and recording the average value as V1; (ii) calculating V2: V2 is an average apparent volume of the 30 discs, and V2=S×H×A, where S is the average area of the 30 discs; H is the thickness of the electrode plate; A is the number of specimens; and (iii) calculating the porosity according to: porosity P=(V2−V1)/V2×100%. For the test process of the porosity of the negative electrode plate, refer to the standard GB/T 24586-2009.

In addition, according to this application, the higher the compacted density of the negative electrode plate, the higher the energy density of the battery. However, an excessive compacted density leads to a decline of power performance. Therefore, the compacted density of the negative electrode plate needs to be controlled within an appropriate range. Therefore, in the negative electrode plate according to this application, the compacted density is 1.45 to 1.90 g/cm³, and optionally 1.55 to 1.80 g/cm³.

In this application, the compacted density of the negative electrode plate may be measured according to the following method: measuring, at 15 points, the thickness of the negative electrode plate and the current collector separately by using a high-precision micrometer (the current collector is produced in the same batch as the negative electrode plate), and averaging out the measured values. The average thickness of the negative electrode plate is $H_A$ (unit: μm), and the average thickness of the current collector is $H_B$ (unit: μm). When the active material is disposed on a single side of the current collector, the compacted density is: 10× areal density/($H_A$−$H_B$). When the active material is disposed on both sides of the current collector, the compacted density is: 20× areal density/($H_A$−$H_B$). The compacted density of the negative electrode plate can be controlled by conventional technical means in this field. For example, the compacted density can be adjusted by fine-tuning the ingredients, graphitization degree, and particle structures.

In this application, after being cold-calendered, a thickness of the first active layer is 20 to 135 μm, and optionally 30 to 120 μm; and, after being cold-calendered, a thickness of the second active layer is 20 to 135 μm, and optionally 30 to 120 μm.

In addition, the first active layer and the second active layer each further include a conductive agent, a binder, and a thickener that are conventionally for use in a negative electrode plate in this field. In the first active layer and the second active layer separately, the weight percent of the active material falls in the range of 92.0 wt % to 98.99 wt %, based on the total weight of all components used for preparing the first active layer and the second active layer separately. In the first active layer and the second active layer separately, the ratio between the active material and the conductive agent, the binder, and the thickener is (92.0 to 98.99 wt %):(0.01 to 2 wt %):(0.5 to 3.5 wt %):(0.5 to 2.5 wt %), and optionally, the ratio is 96.5 wt %:0.6 wt %:1.8 wt %:1.1 wt %.

The conductive agent may be a conventional conductive agent for use in a negative electrode plate in this field. In some embodiments, the conductive agent may be one or more of graphene, acetylene black, single-wall carbon nanotubes, multi-wall carbon nanotubes, superconductive carbon, carbon black, Ketjen black, carbon dots, and carbon nanofibers.

The binder may be a conventional binder for use in a negative electrode plate in this field. In some embodiments, the binder may be one or more of styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), or carboxymethyl chitosan (CMCS).

The thickener may be a conventional thickener for use in a negative electrode plate in this field. In some embodiments, the thickener may be one or more of sodium carboxymethyl cellulose (CMC-Na), lithium carboxymethyl cellulose, or sodium alginate.

In some embodiments, the active material 1 in the first active layer further includes a small amount (weight percent is less than or equal to 10 wt %, based on the total weight of all active materials) of other carbon materials such as hard carbon and soft carbon in addition to artificial graphite.

In some embodiments, the active material 2 in the second active layer further includes a small amount (weight percent is less than or equal to 10 wt %, based on the total weight of all active materials) of other carbon materials such as hard carbon and soft carbon in addition to artificial graphite.

In this application, the active material involved is a carbon material, and in particular, graphite, especially artificial graphite, hard carbon, soft carbon, and the like. Graphite is a form of the element carbon, and is a layered structure. Carbon atoms in a layer form a a bond through $SP^2$ hybridization, so that the acting force is strong and the interlayer van der Waals force is relatively weak. In particular, the artificial graphite in this application may be a single type of artificial graphite, or a mixture of two or more types of artificial graphite that possess different structures and different properties. The artificial graphite or artificial graphite mixture in this application possesses a specified powder OI value and a specified gram capacity, and can achieve the effect of reducing the expansion during cycling. Soft carbon is highly graphitizable carbon, and is amorphous carbon that can be graphitized at a temperature of at least 2500° C. Soft carbon is characterized by a low crystallinity (that is, graphitization degree), a small grain size, a large interplanar spacing (d002), and high compatibility with the electrolytic solution, but a relatively high irreversible capacity of initial discharge, a relatively low output voltage, and no obvious charge-and-discharge plateau potential. Common soft carbons include petroleum coke, needle coke, carbon fibers, and carbon microspheres. Hard carbon means hardly graphitizable carbon, and is a polymerized pyrolytic carbon. This type of carbon is hardly graphitizable even at a temperature of 2500° C. or above. Common hard carbons are resin carbons such as phenol-formaldehyde resin, epoxy resin, or polyfurfuryl alcohol PEA-C. The inventor hereof finds that the effect of reducing the expansion of the negative electrode plate during cycling can also be achieved by mixing specified artificial graphite with a small amount of hard carbon and soft carbon.

In some embodiments, artificial graphite with an OI value and a gram capacity falling within the ranges specified in this application may be selected from existing commercially available artificial graphite, or artificial graphite with the specified OI value and gram capacity may be prepared artificially. For example, the artificial graphite with the specified OI value can be obtained by adjusting the ingredients of artificial graphite (such as petroleum green coke, needle green coke, calcined petroleum coke, calcined needle coke, metallurgical coke, and pitch coke) and the dosage of the binder. For example, in a case that the needle green coke is used in the graphite, the higher the dosage of the binder pitch added during granulation, the lower the OI value of the obtained graphite. The OI value of the obtained graphite is relatively high when the calcined petroleum coke is doped with a zero or low amount of the binder pitch.

In some embodiments, a volume median diameter $D_{v50}$ of the artificial graphite for use in the active material 1 may be 8 to 24 μm, optionally 10 to 20 μm; and the graphitization degree thereof may be 85.0% to 97.5%, and optionally 86.0% to 89.9%. The volume median diameter $D_{v50}$ of the artificial graphite for use in the active material 2 may be 6 to 24 μm, optionally 8 to 20 μm; and the graphitization degree thereof may be 85.0% to 97.5%, and optionally 90.2% to 96.8%. The artificial graphite is an active material configured to prepare the active layer of the negative electrode plate. When an average particle diameter of the artificial graphite is relatively small, the compacted density of the electrode plate is relatively low, and the energy density of the corresponding secondary battery is relatively low. Conversely, when the average particle diameter is relatively large, the kinetics is inferior. In addition, with a higher graphitization degree of the artificial graphite, the gram capacity of the artificial graphite material is higher, the compacted density of the electrode plate is higher, and the energy density of the corresponding secondary battery is higher. Conversely, with a lower graphitization degree, the gram capacity of the artificial graphite material is relatively low, the compacted density of the electrode plate is relatively low, the energy density of the corresponding secondary battery is relatively low, and the secondary battery is unusable. Therefore, it is necessary to limit the average particle diameter, graphite interlayer spacing, and graphitization degree of artificial graphite within the foregoing ranges.

The graphitization degree is a measure of the degree to which crystals of a carbonaceous material resemble perfect graphite after the carbonaceous material is structurally rearranged from amorphous carbon. The graphitization degree of a material may be used as a necessary condition determining whether the material can serve as a negative electrode material of a lithium-ion battery. In addition, the graphitization degree also affects the charge capacity and discharge capacity of a carbon negative electrode. The graphitization degree may be measured with X-ray diffractometry according to the following method: first, measuring a interplanar spacing d002 of the graphite (002), and then performing calculation with a Franklin formula (also known as Mering-Maire formula): $G=(0.3440-d002)/(0.3440-0.3354)\times 100\%$, where G is the graphitization degree (%), 0.3440 is an interlayer spacing (nm) of non-graphitized carbon, 0.3354 is an interlayer spacing of ideal graphite crystals (half of a c-axis lattice constant of hexagonal crystal graphite, measured in nm), and d002 is the interlayer spacing (nm) of the (002) crystal plane of a carbon material. It is hereby noted that in order to obtain a more accurate d002 value, Si powder is usually added to rectify a diffraction angle to reduce errors.

In some embodiments, a powder resistivity of the artificial graphite for use in the active material 1 under an 8 MPa pressure may be at most 0.035 Ω·cm, and optionally at most 0.025 Ω·cm. A powder resistivity of the artificial graphite for use in the active material 2 under an 8 MPa pressure may be at most 0.035 Ω·cm, and optionally at most 0.025 Ω·cm. If the powder resistivity of an artificial graphite is lower, it indicates that the artificial graphite is more conductive, the corresponding negative electrode plate prepared from the artificial graphite is more conductive, the polarization of the battery prepared from the negative electrode plate is lower, the kinetic performance is higher, and therefore, the cycle life longer. The powder resistivity of the artificial graphite may be measured by a method known in this field. For example, the powder resistivity may be measured with a resistivity tester (such as ST2722) based on a four-point probe method: putting a given amount of specimens into a feeding cup of the resistivity tester, applying a pressure until 8 MPa, manually acquiring data, and recording the measured result of the powder resistivity. The test is performed with reference to the standard GB/T 30835-2014.

If the active material 1 and the active material 2 each further contain a small amount of other carbon materials, the method for preparing the active material with the specified OI value and gram capacity is similar to what is described above.

In this application, the negative current collector may be made of a material of high electrical conductivity and high mechanical strength, and serve functions of conducting electrons and collecting current. In some embodiments, the negative current collector may be a metal foil or a composite current collector. For example, the metal foil may be a copper foil. The composite current collector may include a polymer material base layer and a metal layer formed on at least one surface of the polymer material base layer. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

The negative electrode plate according to this application may be prepared by a method including the following steps:
(1) Select an active material with the desired OI value and gram capacity from commercial products, or prepare an active material with the desired OI value and gram capacity;
(2) Mix well the active material 1, conductive agent, binder, and thickener at a given mass ratio in an appropriate amount of deionized water to form a homogeneous negative slurry;

(3) Spread the negative slurry as a first active layer on a surface of the negative current collector;

(4) Mix well the active material 2, conductive agent, binder, and thickener at a given mass ratio in an appropriate amount of deionized water to form a homogeneous negative slurry;

(5) Spread the negative slurry as a second active layer on a surface of the first active layer; and (6) Dry and cold-calender the electrode plate to obtain a negative electrode plate.

Understandably, the negative electrode plate according to this application is not only applicable to a lithium-ion battery, but also applicable to any other batteries, battery modules, battery packs, and electrical devices that need a lower expansion rate and higher cycle performance.

[Positive Electrode Plate]

The positive electrode plate includes a positive current collector and a positive film layer that overlays at least one surface of the positive current collector. The positive film layer includes a positive active material according to the first aspect of this application.

As an example, the positive current collector includes two surfaces opposite to each other in a thickness direction thereof. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material base layer and a metal layer formed on at least one surface of the polymer material base layer. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known in the art for use in a battery. As an example, the positive active material may include at least one of the following materials: olivine-structured lithium-containing phosphate, lithium transition metal oxide, and a modified compound thereof. However, this application is not limited to such materials, and other conventional materials usable as a positive active material of a battery may be used instead. One of the positive active materials may be used alone, or at least two thereof may be combined and used together. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811)), lithium nickel cobalt aluminum oxide (such as $LiNi_{0.85}Co_{0.15}Al_{0.05}O_2$), or a modified compound thereof. Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive film layer further optionally includes a binder. As an example, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly (tetrafluoroethylene-co-hexafluoropropylene), or fluorinated acrylate resin.

In some embodiments, the positive film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, and the binder and any other ingredients in a solvent (such as N-methyl-pyrrolidone) to form a positive slurry, coating a positive current collector with the positive slurry, and performing steps such as drying and cold pressing to obtain the positive electrode plate.

[Electrolyte]

The electrolyte serves to conduct ions between the positive electrode plate and the negative electrode plate. The type of the electrolyte is not specifically limited in this application, and may be selected as required. For example, the electrolyte may be at least one selected from a solid-state electrolyte or a liquid-state electrolyte (that is, electrolytic solution).

In some embodiments, the electrolyte is an electrolytic solution. The electrolytic solution includes an electrolyte salt and a solvent.

In some embodiments, the electrolyte salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluoro(oxalato) borate (LiDFOB), lithium bis(oxalato)borate (LiBOB), lithium difluorophosphate ($LiPO_2F_2$), lithium difluoro(bisoxalato)phosphate (LiDFOP), or lithium tetrafluoro(oxalato)phosphate (LiTFOP).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl) ethane (ESE).

In some embodiments, the electrolytic solution further optionally includes an additive. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

[Separator]

In some embodiments, the secondary battery further includes a separator. The separator is disposed between the positive electrode plate and the negative electrode plate to serve an isolation purpose. The type of the separator is not particularly limited in this application, and may be any well-known porous separator that is highly stable both chemically and mechanically.

In some embodiments, the material of the separator may be at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

[Outer Package]

In some embodiments, the secondary battery may include an outer package configured to package the positive electrode plate, the negative electrode plate, and the electrolyte. As an example, the positive electrode plate, the negative electrode plate, and the separator may be stacked to form a stacked secondary battery or may be wound to form a jelly-roll secondary battery. The secondary battery is packaged in the outer package. The electrolyte may be an electrolytic solution, and the electrolytic solution infiltrates in the electrolytic solution. The quantity of battery cells in the secondary battery may be one or more, and may be adjusted as required.

In an embodiment, this application provides an electrode assembly. In some embodiments, the positive electrode plate, the negative electrode plate, and the separator may be wound or stacked to form an electrode assembly. The outer package may be configured to package the electrode assembly and the electrolyte.

In some embodiments, the outer package of the secondary battery may be a soft package such as a pouch-type soft package. The material of the soft package may be plastic such as one or more of polypropylene (PP), polybutylene terephthalate (PBT), or polybutylene succinate (PBS). In some embodiments, the outer package of the secondary battery may be a hard shell such as a hard plastic shell, an aluminum shell, a steel shell, or the like.

[Secondary Battery]

Figure 2:
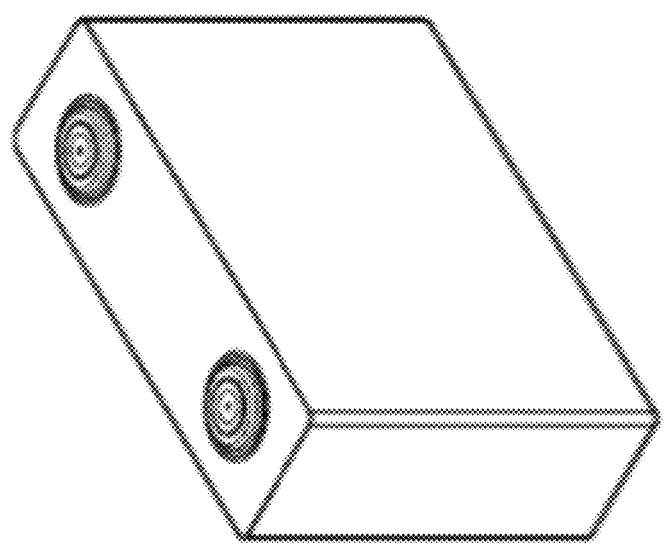
FIG. 2 is a schematic diagram of a secondary battery according to an embodiment of this application.

The shape of the secondary battery is not particularly limited in this application, and may be cylindrical, prismatic or any other shape. FIG. 2 shows a prismatic secondary battery 5 as an example.

Figure 3:
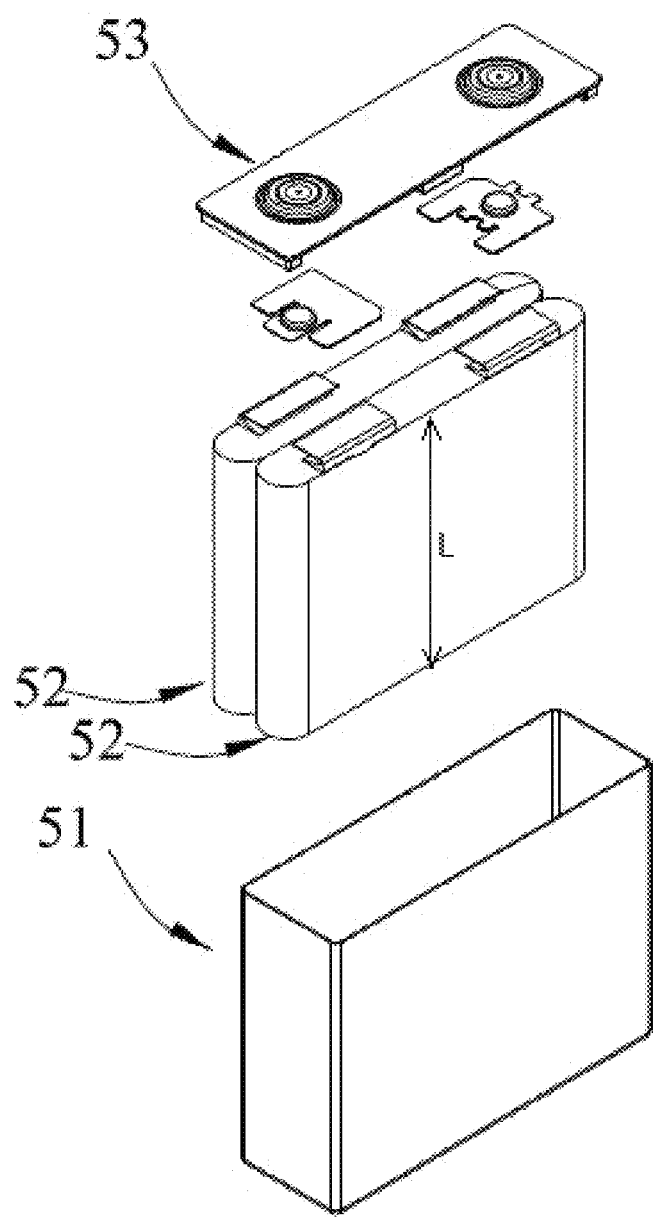
FIG. 3 is an exploded view of the secondary battery shown in FIG. 2 according to an embodiment of this application.

In some embodiments, referring to FIG. 3, the outer package may include a housing 51 and a cover plate 53. The housing 51 may include a bottom plate and a side plate connected to the bottom plate. The bottom plate and the side plate close in to form an accommodation cavity. The housing 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on the application scenario and capacity of the battery module.

Figure 4:
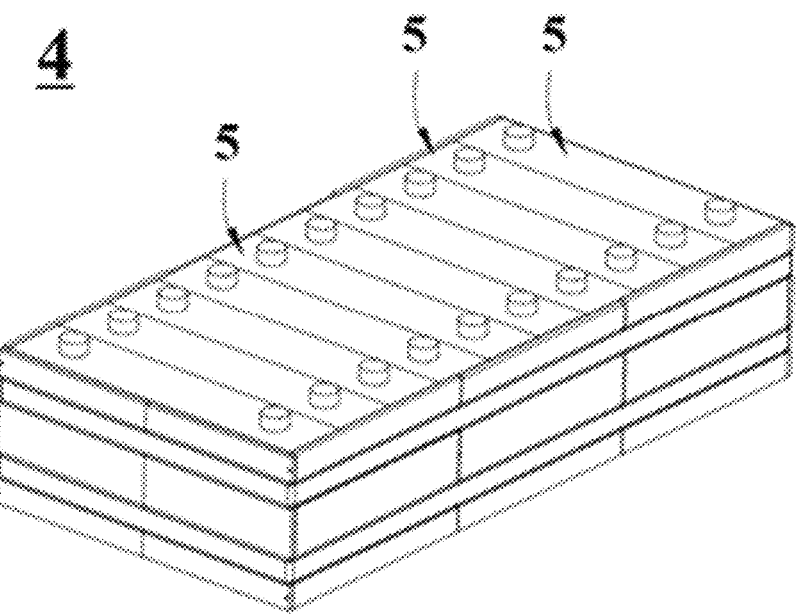
FIG. 4 is a schematic diagram of a battery module according to an embodiment of this application.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

In some embodiments, the battery module 4 may further include a shell that provides an accommodation space. The plurality of secondary batteries 5 are accommodated in the accommodation space.

In some embodiments, the battery modules may be assembled into a battery pack. The battery pack may include one or more battery modules, and the specific number of battery modules in a battery pack may be selected by a person skilled in the art depending on practical applications and capacity of the battery pack.

Figure 5:
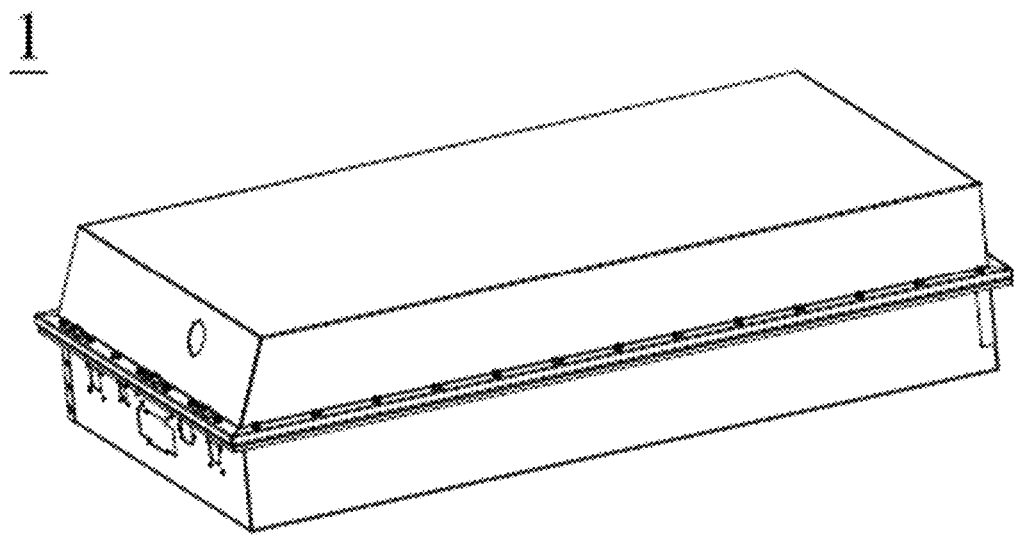
FIG. 5 is a schematic diagram of a battery pack according to an embodiment of this application.
Figure 6:
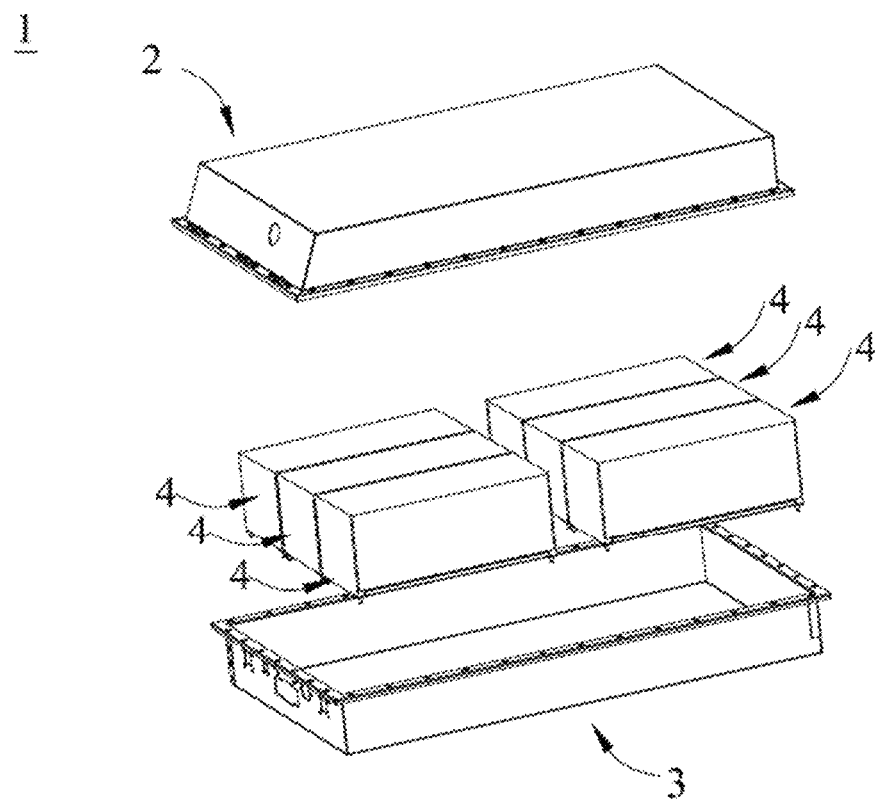
FIG. 6 is an exploded view of the battery pack shown in FIG. 5 according to an embodiment of this application.

FIG. 5 and FIG. 6 show a battery pack 1 as an example. Referring to FIG. 6, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 7:
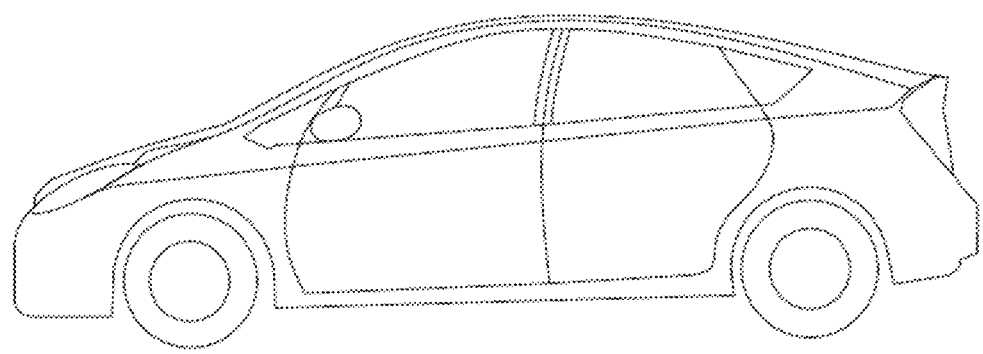
FIG. 7 is a schematic diagram of an electrical device that uses a secondary battery as a power supply according to an embodiment of this application.

FIG. 7 shows an electrical device as an example. The electrical device may be a battery electric vehicle, a hybrid electric vehicle, a plug-in hybrid electric vehicle, or the like. To meet the requirements of the electrical device on a high power and a high energy density of the secondary battery, a battery pack or a battery module may be employed.

In another example, the device may be a mobile phone, a tablet computer, a notebook computer, or the like. The device is generally required to be thin and light, and may have a secondary battery as a power supply.

EMBODIMENTS

The following describes in detail methods for preparing a negative electrode plate, a positive electrode plate, a separator, an electrolytic solution, and a lithium-ion battery according to this application with reference to Embodiment 1. Table 1 shows the relevant preparation parameters of other embodiments and comparative embodiments. It is hereby noted that in the following description, a negative electrode plate 1 corresponds to the negative electrode plate in Embodiment 1, and a battery 1 corresponds to the lithium-ion battery in Embodiment 1.

Embodiment 1

I. Preparing a Lithium-Ion Battery
1. Preparing a Negative Electrode Plate
(1) Active Material 1

The active material 1 is artificial graphite with a gram capacity of 340 mAh/g and an OI value of 12. A preparation process thereof is: grinding needle green coke as a graphite precursor mechanically, removing fine powder with a grading device, and then shaping the coke with a shaping machine. Finally, graphitizing the shaped needle green coke at 2650° C. to obtain the active material 1 in Embodiment 1.

(2) Active Material 2

The active material 2 is artificial graphite with a gram capacity of 360 mAh/g and an OI value of 4. A preparation process thereof is: grinding calcined needle coke as a graphite precursor by calendering, removing fine powder with a grading device, and then shaping the coke with a shaping machine. Subsequently, adding pitch with a softening point of 250° C. (at a weight percent of 15%, based on the total weight of the graphite precursor and pitch) into a horizontal reaction vessel to granulate, and then performing graphitization at 3100° C. to obtain the active material 2 in Embodiment 1.

(3) Negative Electrode Plate

Mixing well artificial graphite (gram capacity: 340 mAh/g, powder OI value: 12), a conductive agent (Super P), a binder (SBR), and a thickener (CMC) at a mass ratio of 96.2:0.8:1.8:1.2 in an appropriate amount of deionized water to form a homogeneous negative slurry. Spreading the negative slurry as a first active layer on both surfaces of the negative current collector copper foil, as shown in FIG. 1.

Mixing well artificial graphite (gram capacity: 360 mAh/g, powder OI value: 4), a conductive agent (Super P), a binder (SBR), and a thickener (CMC) at a mass ratio of 96.2:0.8:1.8:1.2 in an appropriate amount of deionized water to form a homogeneous negative slurry. Spreading the negative slurry as a second active layer on a surface of the first active layer.

Drying and cold-calendering the electrode plate to obtain a negative electrode plate.

2. Preparing a Positive Electrode Plate

Mixing well $LiNi_{0.5}Co_{0.2}Mn_{0.3}O_2$ (NCM523) as a positive active material, Super P as a conductive agent, and PVDF as a binder at a mass ratio of 96.2:2.7:1.1 in an appropriate amount of NMP to form a homogeneous positive slurry. Coating a surface of the positive current collector aluminum foil with the positive slurry, and performing drying and cold-calendering to obtain a positive electrode plate.

3. Preparing an Electrolytic Solution

Mixing ethylene carbonate (EC), ethyl methyl carbonate (EMC), and diethyl carbonate (DEC) at a volume ratio of 1:1:1, and dissolving $LiPF_6$ in the forgoing solution homogeneously to obtain an electrolytic solution, in which the concentration of $LiPF_6$ is 1 mol/L.

4. Separator

Using a polyethylene (PE) film as a separator.

5. Preparing a Secondary Battery

Stacking the positive electrode plate, the separator, and the negative electrode plate sequentially, and winding them to obtain an electrode assembly; placing the electrode assembly into an outer package, injecting the electrolytic solution, and performing steps such as packaging, standing, chemical formation, and aging to obtain the secondary battery in Embodiment 1. The outer package is a hard housing that is 148 mm (length)×28.5 mm (width)×97.5 (height) mm in size.

Other Embodiments and Comparative Embodiments

Preparing the active material 1 and the active material 2 in Embodiments 2 to 17 and Comparative Embodiments 1 to 13 in a way similar to that in Embodiment 1. For details of the required ingredients, binder, binder dosage, graphitization temperature, and graphitization manner, refer to Table 1 below.

TABLE 1

Preparation parameters of active material 1 and active material 2 in embodiments and comparative embodiments

| Serial number | Active material 1 Gram capacity (mAh/g) | Active material 1 Powder OI | Active material 2 Gram capacity (mAh/g) | Active material 2 Powder OI | Active material 1 Type of graphite precursor | Active material 1 Graphitization temperature (° C.) | Active material 2 Type of graphite precursor | Active material 2 Dosage of pitch | Active material 2 Graphitization temperature (° C.) |
|---|---|---|---|---|---|---|---|---|---|
| Embodiment 1 | 340 | 12 | 360 | 4 | Needle green coke | 2650 | Calcined needle coke | 15.0% | 3100 |
| Embodiment 2 | 340 | 12 | 360 | 6 | Needle green coke | 2650 | Calcined needle coke | 10.0% | 3100 |
| Embodiment 3 | 340 | 12 | 360 | 3 | Needle green coke | 2650 | Calcined needle coke | 17.0% | 3100 |
| Embodiment 4 | 340 | 8 | 360 | 4 | Needle green coke | 2650 | Calcined needle coke | 15.0% | 3100 |
| Embodiment 5 | 340 | 11 | 360 | 4 | Needle green coke | 2650 | Calcined needle coke | 15.0% | 3100 |
| Embodiment 6 | 340 | 25 | 360 | 4 | Needle green coke | 2650 | Calcined needle coke | 15.0% | 3100 |
| Embodiment 7 | 310 | 12 | 360 | 4 | Needle green coke | 2500 | Calcined needle coke | 15.0% | 3100 |
| Embodiment 8 | 330 | 10 | 360 | 4 | Metallurgical coke | 2600 | Calcined needle coke | 15.0% | 3100 |
| Embodiment 9 | 350 | 12 | 360 | 4 | Needle green coke | 2800 | Calcined needle coke | 15.0% | 3100 |
| Embodiment 10 | 340 | 12 | 350 | 4 | Needle green coke | 2650 | Needle green coke | 15.0% | 2900 |
| Embodiment 11 | 340 | 12 | 355 | 4 | Needle green coke | 2650 | Needle green coke | 15.0% | 3100 |
| Embodiment 12 | 340 | 12 | 365 | 4 | Needle green coke | 2650 | Calcined needle coke | 15.0% | 3200 |
| Embodiment 13 | 290 | 12 | 355 | 4 | Needle green coke | 2500 | Needle green coke | 15.0% | 3100 |
| Embodiment 14 | 320 | 12 | 368 | 4 | Needle green coke | 2550 | Calcined needle coke | 15.0% | 3250 |
| Embodiment 15 | 320 | 32 | 360 | 6 | Calcined petroleum coke made in Fushun | 2600 | Calcined needle coke | 6.0% | 3100 |
| Embodiment 16 | 320 | 9 | 360 | 2 | Metallurgical coke | 2600 | Calcined needle coke | 18.5% | 3100 |
| Embodiment 17 | 320 | 16 | 360 | 7 | Needle green coke | 2600 | Calcined needle coke | 8.0% | 3100 |
| Comparative Embodiment 1 | 280 | 30 | 355 | 6 | Calcined petroleum coke made in Fushun | 2500 | Needle green coke | 10.0% | 3100 |

TABLE 1-continued

Preparation parameters of active material 1 and active material 2 in embodiments and comparative embodiments

| | Active material 1 | | Active material 2 | | Active material 1 | | Active material 2 | | |
|---|---|---|---|---|---|---|---|---|---|
| Serial number | Gram capacity (mAh/g) | Powder OI | Gram capacity (mAh/g) | Powder OI | Type of graphite precursor | Graphitization temperature (° C.) | Type of graphite precursor | Dosage of pitch | Graphitization temperature (° C.) |
| Comparative Embodiment 2 | 355 | 12 | 365 | 4 | Needle green coke | 3100 | Calcined needle coke | 15.0% | 3200 |
| Comparative Embodiment 3 | 320 | 34 | 360 | 6.5 | Calcined petroleum coke made in Fushun | 2600 | Calcined needle coke | 5.0% | 3100 |
| Comparative Embodiment 4 | 320 | 6 | 360 | 2.5 | Pitch coke | 2600 | Calcined needle coke | 18.0% | 3100 |
| Comparative Embodiment 5 | 320 | 12 | 345 | 4 | Pitch coke | 2600 | Needle green coke | 15.0% | 2850 |
| Comparative Embodiment 6 | 340 | 12 | 370 | 4 | Needle green coke | 2700 | Calcined needle coke | 15.0% | 3300 |
| Comparative Embodiment 7 | 320 | 32 | 360 | 8 | Calcined petroleum coke made in Daqing | 2600 | Calcined needle coke | 3.0% | 3100 |
| Comparative Embodiment 8 | 295 | 10 | 365 | 6 | Pitch coke | 2500 | Calcined needle coke | 10.0% | 3200 |
| Comparative Embodiment 9 | 350 | 19.5 | 360 | 3 | Calcined needle coke | 2900 | Calcined needle coke | 16.0% | 3100 |
| Comparative Embodiment 10 | 295 | 12 | 364 | 4 | Needle green coke | 2500 | Calcined needle coke | 15.0% | 3200 |
| Comparative Embodiment 11 | 350 | 12 | 350 | 4 | Needle green coke | 2900 | Needle green coke | 15.0% | 2900 |
| Comparative Embodiment 12 | 320 | 10 | 360 | 6 | Metallurgical coke | 2600 | Calcined needle coke | 10.0% | 3100 |
| Comparative Embodiment 13 | 320 | 25 | 360 | 4 | Calcined petroleum coke made in Daqing | 2600 | Calcined needle coke | 15.0% | 3100 |

II. Relevant Parameters and Battery Performance Test

1. Determining an OI Value

The OI values of different active materials in this application are tested to obtain an X-ray diffraction pattern of artificial graphite according to the standard JB/T 4220-2011 by using an X-ray diffractometer (Bruker D8 Discover). The peak area C004 of the (004) crystal plane diffraction peak and the peak area C110 of the (110) crystal plane diffraction peak are obtained by integration. The OI value of the artificial graphite is C004/C110. Detailed measurement data is shown in Table 2.

The OI value of the active material 2 in the second active layer in the negative electrode plate according to this application is tested by the following method: scraping the surface of the negative electrode plate to obtain a 20-km-thick material; ultrasonically cleaning the material in a solvent dimethyl carbonate (DMC), N-methyl-pyrrolidone (NMP), and deionized water separately; drying the material in a blast oven to obtain the active material 2; and determining the OI value of the active material 2 according to the foregoing test method.

The OI value of the active material 1 in the first active layer in the negative electrode plate according to this application is tested by the following method: scraping away a top layer of the electrode plate while retaining the 20-km-thick first active layer, and then obtaining the 20-km-thick material by scraping; ultrasonically cleaning the obtained material in a solvent dimethyl carbonate (DMC), NMP, and deionized water separately; drying the material in a blast oven to obtain the active material 1; and determining the OI value of the active material 1 according to the foregoing test method.

2. Determining a Gram Capacity

Mixing well the active material 1 (or active material 2), the conductive agent Super P, and the binder PVDF at a mass ratio of 91.6:1.8:6.6 in a solvent NMP to make a slurry. Coating the current collector copper foil with the prepared slurry, and drying the current collector in an oven for future use. Using a metal lithium sheet as a counter electrode. Using a polyethylene (PE) film as a separator. Mixing ethylene carbonate (EC), ethyl methyl carbonate (EMC), and diethyl carbonate (DEC) at a volume ratio of 1:1:1, and dissolving $LiPF_6$ in the forgoing solution homogeneously to obtain an electrolytic solution, in which the concentration of $LiPF_6$ is 1 mol/L. Assembling the foregoing parts into a CR2430 button battery in an argon gas-protected glovebox.

Leaving the obtained button battery to stand for 12 hours, and then discharging the battery at a constant current of 0.05 C until the voltage reaches 0.005 V, and leaving the battery to stand for 10 minutes. Discharging the battery at a constant current of 50 μA until the voltage reaches 0.005 V, and leaving the battery to stand for 10 minutes. Discharging the battery at a constant current of 10 μA until the voltage reaches 0.005 V. Subsequently, charging the battery at a constant current of 0.1 C until the voltage reaches 2 V. Recording the charge capacity. The ratio of the charge capacity to the mass of the artificial graphite is the gram capacity of the prepared artificial graphite. Detailed measurement data is shown in Table 2.

3. Testing a Cycle Expansion Rate of the Negative Electrode Plate

Denoting a thickness of a cold-calendered negative electrode plate as H0, and then making the cold-calendered negative electrode plate, the positive electrode plate, the separator, and the electrolytic solution into a secondary battery. The specific process has been described in section III above. Leaving a prepared secondary battery to undergo 1 C/1 C cycling at 100% depth of discharge (DOD) under 25° C. (100% DOD means that the battery is fully discharged after being fully charged) on a Neware charger-and-discharger machine. Denoting the discharge capacity at the end of the first cycle (that is, initial capacity) as 100%. Stopping cycling when the cycle capacity retention rate reaches 80% of the initial capacity. Subsequently, charging the secondary battery to 100% State of Charge (SOC), and then disassembling the secondary battery and measuring the thickness of the corresponding negative electrode plate, denoted as H1. Therefore, the cycle expansion rate of the negative electrode plate is: (H1/H0−1)×100%. Detailed measurement data is shown in Table 2 to Table 6.

4. Testing the Bonding Force Between the Active Layer and the Current Collector

Affixing double-sided tape (Hi-BON 5000NS; width: 2 cm) to a stainless steel sheet. Cutting the to-be-tested electrode plate into the same shape and size as the double-sided tape (roughly rectangular), and sticking the electrode plate onto the double-sided tape. Scratching a gap on the electrode plate in a direction parallel to the short edge of the electrode plate, and using a blade to gently peel the active layer away from a contact region between the active layer and the copper foil (by a length of approximately 1 cm). Inserting a 2-cm-wide paper strip into the gap, and applying crepe adhesive to bond the paper strip tightly. Placing the steel sheet vertically in the middle of a lower slot of a GoTech tensile testing machine, and placing the paper strip in the middle of an upper slot of the GoTech tensile testing machine. Setting the speed to fixed 50 mm/min, and setting the displacement to 60 mm. Resetting the data on the computer to zero, clicking Start to start the test, and reading the bonding force data upon completion of the test. Detailed measurement data is shown in Table 2 to Table 6.

5. Testing the Energy Density of a Secondary Battery

Charging a secondary battery at a constant current of ⅓ C at 25° C. until the voltage reaches 4.3 V, and then charging the battery at a constant voltage of 4.3 V until the current reaches 0.05 C; leaving the battery to stand for 5 minutes, and then discharging the battery at a constant current of ⅓ C until the voltage reaches 2.8 V; and recording the discharge energy at this time. The discharge energy of the battery is divided by the weight of the battery to obtain the weight energy density of the battery, measured in Wh/Kg. Detailed measurement data is shown in Table 2 to Table 6.

6. Cycle Capacity Retention Rate of the Secondary Battery

Performing a charge-and-discharge test on the lithium-ion batteries in all embodiments and comparative embodiments in a 25° C. environment. A charge-and-discharge cycle is as follows: charging the battery at a constant current of 1 C until the voltage reaches 4.3 V, and then charging the battery at a constant voltage of 4.3 V until the current reaches 0.05 C; leaving the battery to stand for 5 minutes, and then discharging the battery at a constant current of 1 C until the voltage reaches 2.8 V; and recording the battery capacity at this time as C1, thereby completing a charge-and-discharge cycle of the battery. Repeating the foregoing process for 1500 cycles, and recording the battery capacity C1500 at this time. Cycle capacity retention rate=C1500/C1×100%. Detailed measurement data is shown in Table 2 to Table 6.

TABLE 2

Embodiments 1 to 17 of this application

| Serial number | Active material 1 Gram capacity (mAh/g) | Active material 1 Powder OI | Active material 2 Gram capacity (mAh/g) | Active material 2 Powder OI | α (ratio of OI value) | β (ratio of gram capacity) | α/β | Bonding force (N/m) | Cycle expansion rate of negative electrode plate (%) | Energy density (Wh/kg) | Cycle capacity retention rate (%) |
|---|---|---|---|---|---|---|---|---|---|---|---|
| Embodiment 1 | 340 | 12 | 360 | 4 | 3.00 | 0.94 | 3.18 | 15.5 | 27.2 | 226.6 | 89.5% |
| Embodiment 2 | 340 | 12 | 360 | 6 | 2.00 | 0.94 | 2.12 | 15.6 | 28.5 | 226.6 | 89.0% |
| Embodiment 3 | 340 | 12 | 360 | 3 | 4.00 | 0.94 | 4.24 | 15.2 | 26.9 | 226.6 | 89.8% |
| Embodiment 4 | 340 | 8 | 360 | 4 | 2.00 | 0.94 | 2.12 | 13.3 | 26.8 | 226.6 | 89.8% |
| Embodiment 5 | 340 | 11 | 360 | 4 | 2.75 | 0.94 | 2.91 | 14.5 | 27.0 | 226.6 | 89.6% |
| Embodiment 6 | 340 | 25 | 360 | 4 | 6.25 | 0.94 | 6.62 | 16.6 | 28.2 | 226.6 | 89.1% |
| Embodiment 7 | 310 | 12 | 360 | 4 | 3.00 | 0.86 | 3.48 | 15.3 | 27.0 | 223.1 | 89.6% |
| Embodiment 8 | 330 | 10 | 360 | 4 | 2.50 | 0.92 | 2.72 | 13.1 | 27.1 | 224.6 | 89.6% |
| Embodiment 9 | 350 | 12 | 360 | 4 | 3.00 | 0.97 | 3.09 | 15.6 | 27.6 | 227.3 | 89.4% |
| Embodiment 10 | 340 | 12 | 350 | 4 | 3.00 | 0.97 | 3.09 | 15.3 | 27.0 | 224.6 | 89.6% |
| Embodiment 11 | 340 | 12 | 355 | 4 | 3.00 | 0.96 | 3.13 | 15.7 | 27.1 | 225.1 | 89.6% |
| Embodiment 12 | 340 | 12 | 365 | 4 | 3.00 | 0.93 | 3.22 | 15.2 | 28.2 | 226.8 | 89.1% |
| Embodiment 13 | 290 | 12 | 355 | 4 | 3.00 | 0.82 | 3.66 | 15.9 | 26.5 | 222.9 | 89.9% |
| Embodiment 14 | 320 | 12 | 368 | 4 | 3.00 | 0.86 | 3.49 | 15.8 | 27.0 | 224.6 | 89.6% |
| Embodiment 15 | 320 | 32 | 360 | 6 | 5.33 | 0.89 | 5.99 | 16.0 | 28.2 | 223.8 | 89.1% |
| Embodiment 16 | 320 | 9 | 360 | 2 | 4.50 | 0.89 | 5.06 | 13.0 | 26.2 | 223.8 | 90.1% |
| Embodiment 17 | 320 | 16 | 360 | 7 | 2.29 | 0.89 | 2.57 | 16.1 | 28.3 | 223.8 | 89.1% |

TABLE 3

Comparative Embodiments 1 to 7 investigate gram capacity and OI value range of active material 1 and active material 2

| Serial number | Active material 1 Gram capacity (mAh/g) | Active material 1 Powder OI | Active material 2 Gram capacity (mAh/g) | Active material 2 Powder OI | α (ratio of OI value) | β (ratio of gram capacity) | α/β | Bonding force (N/m) | Cycle expansion rate of negative electrode plate (%) | Energy density (Wh/kg) | Cycle capacity retention rate (%) |
|---|---|---|---|---|---|---|---|---|---|---|---|
| Comparative Embodiment 1 | 280 | 30 | 355 | 6 | 5.00 | 0.81 | 6.17 | 15.9 | 29.7 | 215.1 | 87.1% |
| Comparative Embodiment 2 | 355 | 12 | 365 | 4 | 3.00 | 0.97 | 3.00 | 15.8 | 30.8 | 228.2 | 86.8% |

TABLE 3-continued

Comparative Embodiments 1 to 7 investigate gram capacity and OI value range of active material 1 and active material 2

| Serial number | Active material 1 Gram capacity (mAh/g) | Active material 1 Powder OI | Active material 2 Gram capacity (mAh/g) | Active material 2 Powder OI | α (ratio of OI value) | β (ratio of gram capacity) | α/β | Bonding force (N/m) | Cycle expansion rate of negative electrode plate (%) | Energy density (Wh/kg) | Cycle capacity retention rate (%) |
|---|---|---|---|---|---|---|---|---|---|---|---|
| Comparative Embodiment 3 | 320 | 34 | 360 | 6.5 | 5.23 | 0.89 | 5.88 | 16.7 | 30 | 223.8 | 86.9% |
| Comparative Embodiment 4 | 320 | 6 | 360 | 2.5 | 2.40 | 0.89 | 2.70 | 5.6 | / | 223.8 | / |
| Comparative Embodiment 5 | 320 | 12 | 345 | 4 | 3.00 | 0.93 | 3.23 | 15.5 | 27.2 | 216.1 | 89.4% |
| Comparative Embodiment 6 | 340 | 12 | 370 | 4 | 3.00 | 0.91 | 3.30 | 15.7 | 30.7 | 226.9 | 86.6% |
| Comparative Embodiment 7 | 320 | 32 | 360 | 8.00 | 4.00 | 0.89 | 4.49 | 16.5 | 30.8 | 223.8 | 86.3% |

Note:
In Comparative Embodiment 4, the cycle expansion rate and the cycle capacity retention rate of the negative electrode plate are unable to be detected due to processing abnormality caused by a deficient bonding force.

TABLE 4

Comparative Embodiments 8 to 9 investigate ratio of powder OI value between active materials

| Serial number | Active material 1 Gram capacity (mAh/g) | Active material 1 Powder OI | Active material 2 Gram capacity (mAh/g) | Active material 2 Powder OI | α (ratio of OI value) | β (ratio of gram capacit) | α/β | Bonding force (N/m) | Cycle rate of expansion negative electrode plate (%) | Energy density (Wh/kg) | Cycle capacity retention rate (%) |
|---|---|---|---|---|---|---|---|---|---|---|---|
| Comparative Embodiment 8 | 295 | 10 | 365 | 6 | 1.67 | 0.81 | 2.06 | 13.3 | 29.6 | 216.3 | 87.0% |
| Comparative Embodiment 9 | 350 | 19.5 | 360 | 3 | 6.50 | 0.97 | 6.70 | 15.9 | 29.4 | 226.9 | 87.2% |

TABLE 5

Comparative Embodiments 10 to 11 investigate ratio of gram capacity between active materials

| Serial number | Active material 1 Gram capacity (mAh/g) | Active material 1 Powder OI | Active material 2 Gram capacity (mAh/g) | Active material 2 Powder OI | α (ratio of OI value) | β (ratio of gram capacity) | α/β | Bonding force (N/m) | Cycle expansion rate of negative electrode plate (%) | Energy density (Wh/kg) | Cycle capacity retention rate [%] |
|---|---|---|---|---|---|---|---|---|---|---|---|
| Comparative Embodiment 10 | 295 | 12 | 364 | 4 | 3.00 | 0.81 | 3.70 | 15.3 | 30.5 | 216.1 | 86.7% |
| Comparative Embodiment 11 | 350 | 12 | 350 | 4 | 3.00 | 1.00 | 3.00 | 15.3 | 29.9 | 226.7 | 86.9% |

TABLE 6

Comparative Embodiments 12 to 13 investigate α/β

| Serial number | Active material 1 | | Active material 2 | | α (ratio of OI value) | β (ratio of gram capacity) | α/β | Bonding force (N/m) | Cycle expansion rate of negative electrode plate (%) | Energy density (Wh/kg) | Cycle capacity retention rate (%) |
|---|---|---|---|---|---|---|---|---|---|---|---|
| | Gram capacity (mAh/g) | Powder OI | Gram capacity (mAh/g) | Powder OI | | | | | | | |
| Comparative Embodiment 12 | 320 | 10 | 360 | 6 | 1.67 | 0.89 | 1.88 | 13.2 | 29.8 | 223.8 | 86.8% |
| Comparative Embodiment 13 | 320 | 25 | 360 | 4 | 6.25 | 0.89 | 7.02 | 15.9 | 31.5 | 223.8 | 85.6% |

As can be seen from above, in contrast to Comparative Embodiments 1 to 13, Embodiments 1 to 17 control the powder OI value and gram capacity of the active material within a specified range, and further control the difference in the OI value and gram capacity between the active material of one active layer and the active material of the other active layer to fall within a specified range. In this way, the obtained negative electrode plate achieves a significantly lower cycle expansion rate, a relatively high energy density, and a significantly higher cycle capacity retention rate on the basis of ensuring a sufficient bonding force.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A negative electrode plate, comprising:
a current collector;
a first active layer, located on at least one surface of the current collector, and containing an active material 1; and
a second active layer, located on at least one surface that is of each of the two first active layers and that is away from the current collector, and containing an active material 2, wherein
a powder OI (orientation index) value of the active material 1 falls in a range of 8 to 32, and a powder OI value of the active material 2 falls in a range of 2 to 7;
a gram capacity of the active material 1 falls in a range of 290 to 350 mAh/g; and
a gram capacity of the active material 2 falls in a range of 350 to 368 mAh/g.

2. The negative electrode plate according to claim 1, wherein
a ratio α of the powder OI value between the active material 1 and the active material 2 falls in a range of 2.00 to 6.25.

3. The negative electrode plate according to claim 1, wherein
a ratio β of the gram capacity between the active material 1 and the active material 2 falls in a range of 0.80 to 1.00.

4. The negative electrode plate according to claim 2, wherein
a ratio β of the gram capacity between the active material 1 and the active material 2 falls in a range of 0.80 to 1.00; and
a ratio of α to β, that is, α/β, falls within a range of 2.0 to 6.7.

5. The negative electrode plate according to claim 1, wherein
an areal density of the first active layer is 3 to 10 mg/cm²; and
an areal density of the second active layer is 3 to 10 mg/cm².

6. The negative electrode plate according to claim 1, wherein
based on a total weight of the first active layer, a weight percent of the active material 1 falls in a range of 92.0 wt % to 98.99 wt %; and
based on a total weight of the second active layer, a weight percent of the active material 2 falls in a range of 92.0 wt % to 98.99 wt %.

7. The negative electrode plate according to claim 1, wherein a porosity of the negative electrode plate is 18.0% to 40.2%.

8. The negative electrode plate according to claim 1, wherein
a compacted density of the negative electrode plate is 1.45 to 1.90 g/cm³.

9. The negative electrode plate according to claim 1, wherein
after being cold-calendered, a thickness of the first active layer is 20 to 135 μm; and
after being cold-calendered, a thickness of the second active layer is 20 to 135 μm.

10. The negative electrode plate according to claim 1, wherein the first active layer or the second active layer further comprises a conductive agent, a binder, and a thickener.

11. The negative electrode plate according to claim 1, wherein the active material 1 comprises artificial graphite or is made up of artificial graphite; and
comprises another carbon material selected from hard carbon, soft carbon, or a combination thereof.

12. The negative electrode plate according to claim 1, wherein the active material 2 comprises artificial graphite or is made up of artificial graphite; and
comprises another carbon material selected from hard carbon, soft carbon, or a combination thereof.

13. A secondary battery, comprising the negative electrode plate according to claim 1.

14. A battery module, comprises the secondary battery according to claim 13.

15. The negative electrode plate according to claim 1, wherein the powder OI value of the active material 1 falls in a range of 10 to 25.

16. The negative electrode plate according to claim 1, wherein the powder OI value of the active material 2 falls in a range of 3 to 6.

17. The negative electrode plate according to claim 5, wherein the area density of the first active layer is 4 to 8 mg/cm².

18. The negative electrode plate according to claim 5, wherein the area density of the second active layer is 4 to 8 mg/cm².

19. The negative electrode plate according to claim 7, wherein the porosity of the negative electrode plate is 22.5% to 35.0%.

20. The negative electrode plate according to claim 8, wherein the compacted density of the negative electrode plate is 1.55 to 1.80 g/cm³.

\* \* \* \* \*